US012665865B2

(12) United States Patent
Arunachalam et al.

(10) Patent No.: US 12,665,865 B2
(45) Date of Patent: Jun. 23, 2026

(54) CONTEXT-BASED GENERATIVE ARTIFICIAL INTELLIGENCE SYSTEM

(71) Applicant: PayPal, Inc., San Jose, CA (US)

(72) Inventors: Elavarasi Arunachalam, San Jose, CA (US); Srinivasa Sai Kaushal Bondada, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 29 days.

(21) Appl. No.: 18/390,754

(22) Filed: Dec. 20, 2023

(65) Prior Publication Data

US 2025/0211549 A1     Jun. 26, 2025

(51) Int. Cl.
*H04L 51/02* (2022.01)
(52) U.S. Cl.
CPC .................................... *H04L 51/02* (2013.01)
(58) Field of Classification Search
CPC ...................................................... H04L 51/02
See application file for complete search history.

(56) References Cited

U.S. PATENT DOCUMENTS

| | | | |
|---|---|---|---|
| 2014/0278349 A1* | 9/2014 | Grieves ................. | G06F 40/242 |
| | | | 704/8 |
| 2022/0214863 A1* | 7/2022 | Clement ................... | G06F 8/44 |
| 2024/0386038 A1* | 11/2024 | Amershi ................... | G06F 9/00 |
| 2024/0394291 A1* | 11/2024 | Nelson .................... | G06F 40/30 |
| 2025/0045314 A1* | 2/2025 | Madnani ............. | G06F 16/3329 |
| 2025/0119396 A1* | 4/2025 | Taheri ..................... | H04L 51/02 |
| 2025/0139160 A1* | 5/2025 | Miller ................. | H04N 21/251 |

* cited by examiner

*Primary Examiner* — Soe Hlaing
(74) *Attorney, Agent, or Firm* — Haynes and Boone, LLP

(57) ABSTRACT

Systems, methods, and computer program products for using a generative artificial intelligence system to generate answers or summaries is provided. During the ingestion stage, the system receives documents and transcripts that include data associated with a theme. The data is converted into a common format and is divided into chunks. The chunks are associated with metadata tags that include chunk and data information. From the chunks, the system generates embedding vectors. During the inference stage, the system receives an information request. If the information request is a question, the system generates a vector from the question, and uses a similarity search to identify similar vectors. From the similar vectors, the system identifies chunks. If the information request includes a summary request, the system uses the metadata tags to identify chunks with summary information. The system generates an answer or a summary from the identified chunks.

20 Claims, 9 Drawing Sheets

100

200

300

600

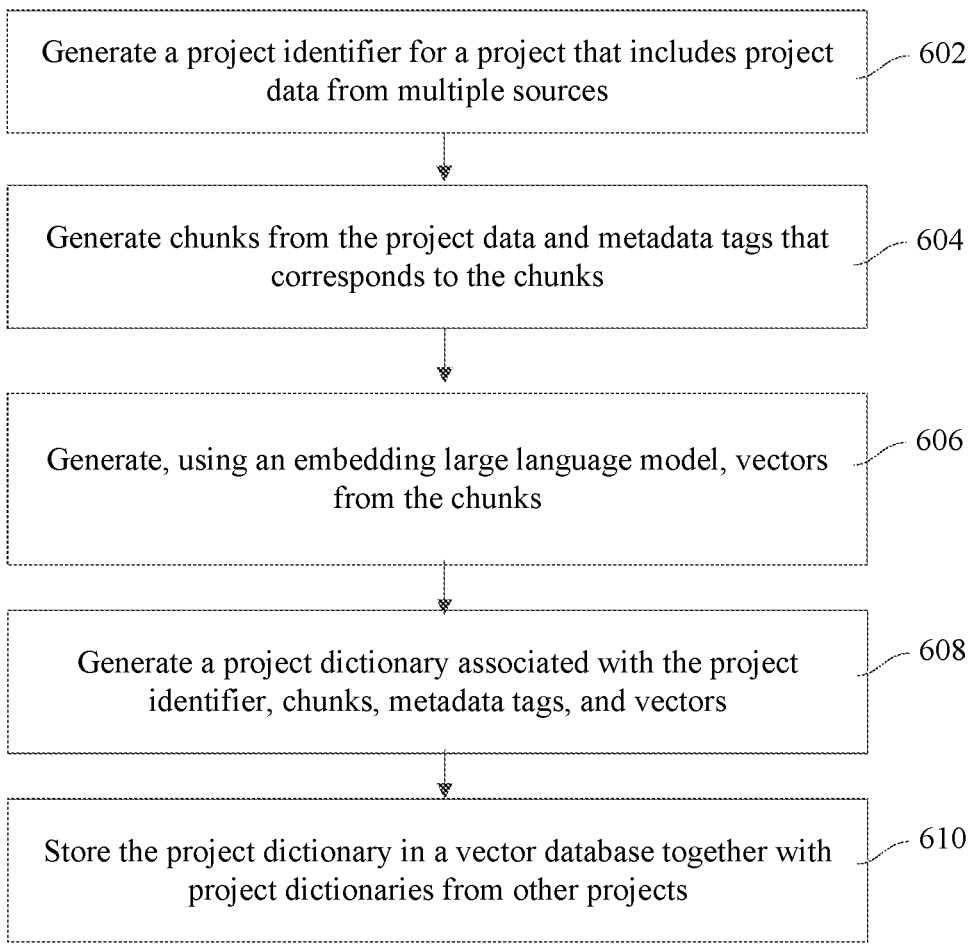

Generate a project identifier for a project that includes project data from multiple sources ⟋ 602

Generate chunks from the project data and metadata tags that corresponds to the chunks ⟋ 604

Generate, using an embedding large language model, vectors from the chunks ⟋ 606

Generate a project dictionary associated with the project identifier, chunks, metadata tags, and vectors ⟋ 608

Store the project dictionary in a vector database together with project dictionaries from other projects ⟋ 610

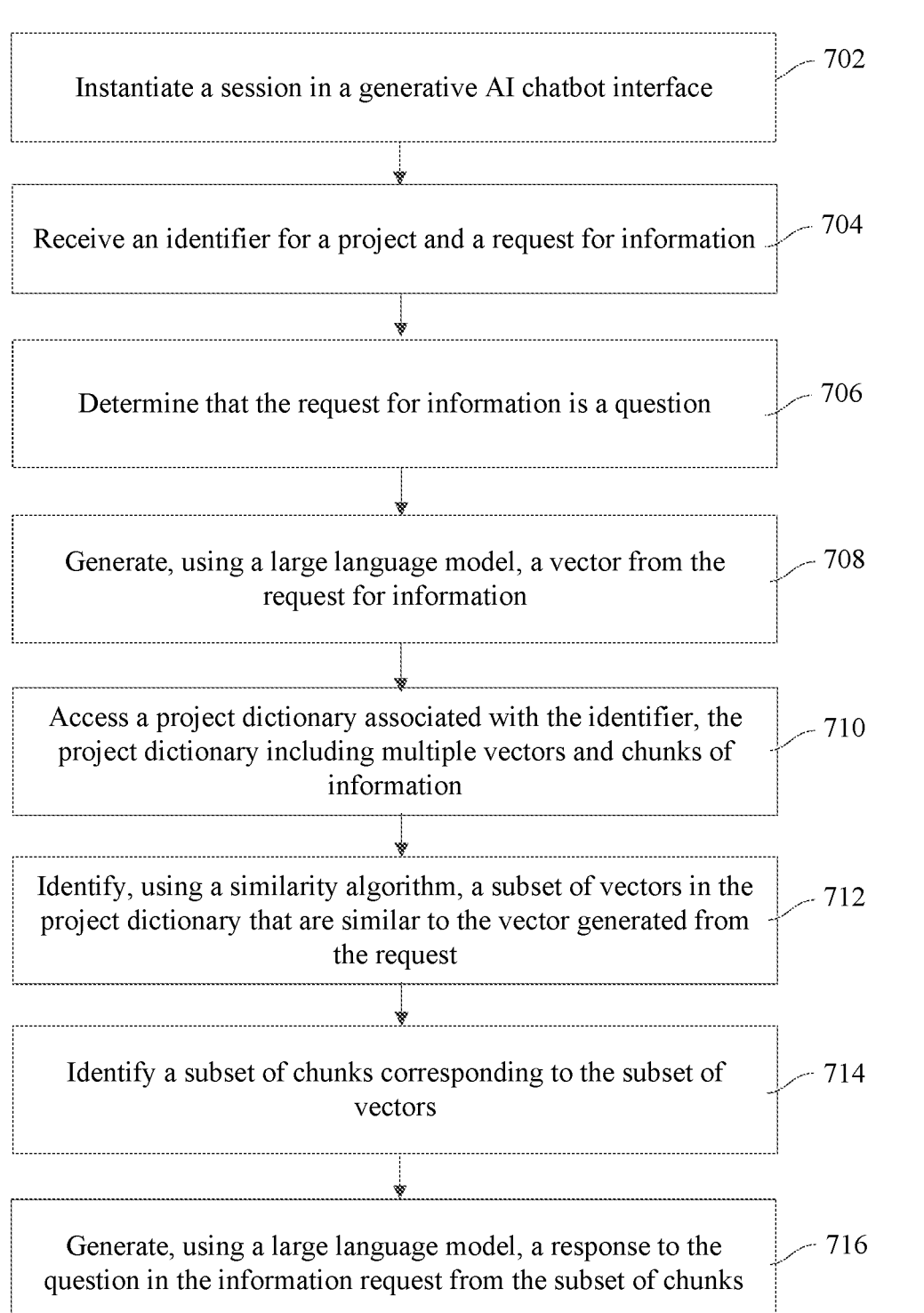

Instantiate a session in a generative AI chatbot interface — 702

Receive an identifier for a project and a request for information — 704

Determine that the request for information is a question — 706

Generate, using a large language model, a vector from the request for information — 708

Access a project dictionary associated with the identifier, the project dictionary including multiple vectors and chunks of information — 710

Identify, using a similarity algorithm, a subset of vectors in the project dictionary that are similar to the vector generated from the request — 712

Identify a subset of chunks corresponding to the subset of vectors — 714

Generate, using a large language model, a response to the question in the information request from the subset of chunks — 716

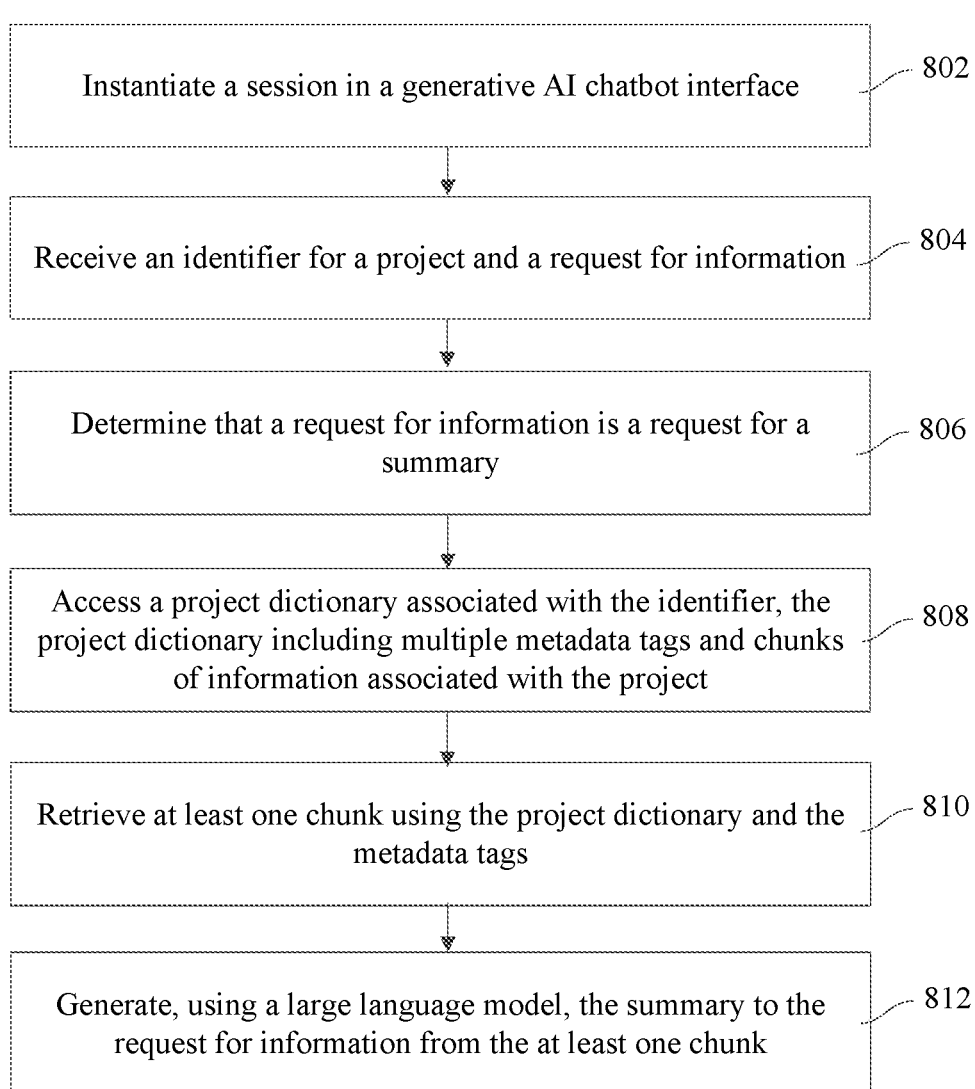

Instantiate a session in a generative AI chatbot interface — 802

Receive an identifier for a project and a request for information — 804

Determine that a request for information is a request for a summary — 806

Access a project dictionary associated with the identifier, the project dictionary including multiple metadata tags and chunks of information associated with the project — 808

Retrieve at least one chunk using the project dictionary and the metadata tags — 810

Generate, using a large language model, the summary to the request for information from the at least one chunk — 812

FIG. 8

CONTEXT-BASED GENERATIVE ARTIFICIAL INTELLIGENCE SYSTEM

TECHNICAL FIELD

The disclosure generally relates to generative artificial intelligence, and more specifically converting context-based data into chunks and vectors to generate context based answers and summaries using generative artificial intelligence.

BACKGROUND

A computing environment may include hundreds or thousands of documents and transcripts associated with a particular topic or project that are scattered throughout computing devices in the computing environment. As time passes, the number of documents and transcripts increases, and the content of the documents and transcripts is likely to change. As a result, significant time and resources are allocated to tracking, storing, and retrieving the documents, and also to tracking the changes in the content. Moreover, documents may be in various formats that may not always be accessible or compatible with computing devices.

BRIEF DESCRIPTION OF THE DRAWINGS

FIG. 6 is a flowchart of a method for ingesting data from data sources, according to some embodiments.

FIGS. 7-8 are a flowcharts of methods for generating a response to an information request, according to some embodiments.

Figure 1:
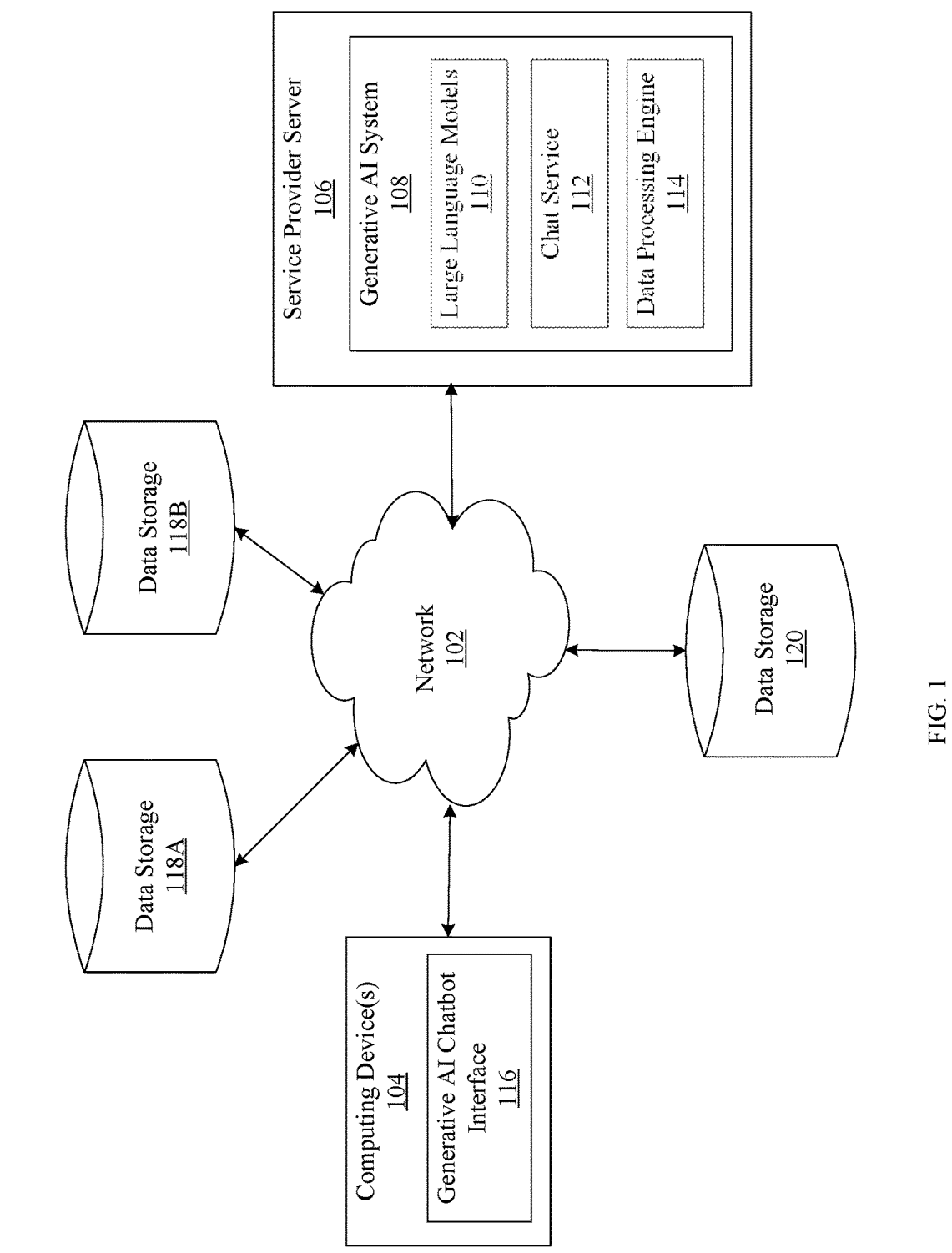
FIG. 1 is an exemplary system where a generative artificial intelligence (AI) system can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The embodiments are directed to a generative artificial intelligence (AI) system for generating answers to questions or generating summaries from data included in various data sources and in multiple domains. The data may be associated with a common theme, such as a project, including a software application project. The data may be included in documents or transcripts that may be generated during various stages of the project development. The documents and transcripts may include various types of data, including alphanumeric text in a natural language, tables, images, design documents, meeting notes, audio recording of the meetings, video calls, and the like.

The generative AI system operates during two stages: an ingestion stage and an inference stage. During the ingestion stage, the generative AI system may format data within a domain into a unified format and convert data into chunks and vector embeddings that may be efficiently accessed and traversed to obtain information. During the inference stage, the generative AI system may receive information requests that may access the embedding vectors and chunks that contain the information relevant to the requests, and use generative AI to convert the embedding vectors and chunks into responses.

More specifically, during an ingestion stage, a generative AI system may receive data from various sources. The data may correspond to a project and may be included in documents, transcripts, and the like. The generative AI system may convert the data into a uniform format and may also generate an identifier, such as a project identifier, for the data. Next, the generative AI system may divide the data in the uniform format into chunks having a predefined length. The generative AI system may also associate metadata tags with the chunks. There may be one metadata tag for one chunk in some embodiments. The metadata tag may include the identifier, the title of the chunk, the hierarchy of the chunk compared to other chunks, the data source (e.g., the document or transcript from where the chunk came from), and the like. From the chunks, an embedding large language model (LLM) may generate embedding vectors (or simply vectors). The vectors may include numeric embeddings that represent information in the chunks. The generative AI system may generate a dictionary for the data, where the dictionary includes or points to an identifier, chunks, metadata tags, and vectors associated with the data. The generative AI system may store the dictionary, including the identifier, chunks, metadata tags, and vectors in a vector storage, or a combination of various storage devices.

During an inference stage, a generative AI chatbot interface may enter into a dialogue with a user operating a computing device. As part of the dialogue, the generative AI chatbot interface may receive an identifier and a request for information which the generative AI chatbot interface may pass to the generative AI system.

The generative AI system may vary the processing of the information request based on the request type. For example, the generative AI system may use an LLM to determine whether the request for information is a question/answer request or a summary request. If the request for information is a question/answer request, the generative AI system may use the same or different LLM to determine an embedding vector of the request for information. Next, the generative AI system may identify a dictionary that corresponds to the identifier and stores or is associated with the vectors corresponding to the identifier. Using the dictionary, the generative AI system may use a similarity algorithm to identify a subset of vectors that are similar to the embedding vector associated with the request for information. Using the subset of vectors, the generative AI system may access the subset of chunks that correspond to the vectors. From the subset of chunks, the generative AI system may use a same or different LLM model to generate an answer to the question in the request for information. The generative AI system may also refine the answer using the subset of chunks or retrieve additional chunks corresponding to the vectors stored in the vector storage.

If the request for information is a request for a summary, the generative AI system may use the identifier to identify the dictionary. From the dictionary, the generative AI system may use the metadata tags to identify a subset of chunks that may include information that may be used to generate the summary. Next, the generative AI system may use the subset of chunks to generate a summary. Notably, the generative AI system may refine the summary using the subset of chunks or retrieving additional chunks from the vectors.

The generative AI system may be particularly useful in summarizing projects and generating answers to questions associated with projects. Projects, such as software projects, may involve various stages of development, including a planning stage, a development stage, a testing and quality assurance stage, and a release stage. Each of the various stages may generate various documents, transcripts, and the like. Further, as the project evolves, the documentation may also evolve and change. Accordingly, it may be difficult for a user to obtain project documentation, project requirements, various test cases, issues encountered during the projects, and the like, because this information may be scattered among multiple data sources. The generative AI system may ingest the various documentation and store the documentation as chunks tagged with metadata tags and as embedding vectors. Once ingested, the generative AI may receive information requests that may be question/answer requests or summary requests, and use various LLM models to identify chunks and/or vectors relevant to the requests, and use the relevant chunks or vectors to generate responses, such as summaries of the projects or answers to the questions in the requests.

The generative AI system may also include multiple benefits. For example, the generative AI system may boost user productivity by providing readily available information, including answers to questions and summaries across multiple documents. The generative AI system may also accelerate an employee onboarding process by providing an interactive access to information. The generative AI system may also reduce costs by reducing time and resources used to solve problems. This in turn may translate into test case optimization, a decrease in a number of errors in a project, and overall employee satisfaction.

Further embodiments of the generative AI system are discussed below.

FIG. 1 is an exemplary system 100 where embodiments can be implemented. System 100 may be a computing environment or a computing system. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network.

Various components that are accessible to network 102 may be computing device(s) 104 and service provider server (s) 106. Computing devices 104 may be portable and non-portable electronic devices under the control of a user and configured to transmit, receive, and manipulate data from service provider server(s) 106 over network 102. Example computing devices 104 include desktop computers, laptop computers, tablets, smartphones, wearable computing devices, eyeglasses that incorporate computing devices, implantable computing devices, etc.

Server(s) 106 may be electronic devices configured for large scale data processing and service, and may include a physical computer, a data center, a server program that facilitates processing, and the like. Server 106 may include a generative AI system 108. Generative AI system 108 may be implemented in software, hardware, or a combination of software and hardware. Generative AI system 108 may include one or more large language models 110, a chat service 112, and a data processing engine 114.

Computing device(s) 104 may include a generative AI chatbot interface 116. Generative AI chatbot interface 116 may enter into a dialogue with a user operating computing device 104. For example, a user may establish a session with generative AI chatbot interface 116 and enter a request, make a comment, and the like into generative AI chatbot interface 116. Generative AI chatbot interface 116 may communicate with generative AI system 108 and provide a user with a response, a comment, and the like. In particular, one of the LLMs 110 in generative AI system 108 may receive the user's input and generate a response. The back and forth communication between the user and the generative AI chatbot interface may constitute a dialogue.

Generative AI system 108 may ingest data from multiple data sources. Once generative AI system 108 ingests the data, generative AI system 108 may receive, via generative AI chatbot interface 116 requests for information associated with the data, and generate one or more responses. The requests for information may be included in a dialogue between generative AI system 108 and a user controlling computing device 104. The responses to the requests for information may include answers to questions in the information requests or summaries of the data for the summary requests.

As discussed above, data may include text, images, tables, audio and video files, etc., that may be collected from multiple data sources. Data sources may include documents, transcripts, audio and video recordings from various meetings, handwritten notes, source code, and the like. Data sources may be associated with a common theme or domain that may be identified using an identifier. For example, suppose a theme or a domain is a project for developing a software application, a product or a service. The project may include various stages, including a formation stage, a requirements and planning stage, a construction stage, a testing stage, a release stage, and a post implementation stage. During each stage, the project may generate various documentation that may be captured in various data sources. For example, the formation stage may generate documents that include project estimates. The requirements stage may generate documents pertaining to functional requirements, technical requirements, review and approval documentation, and/or a statement of work. The design stage may generate internal and external documentation, design review documentation, and/or detailed project development documentation. The construction stage may generate a project prototype and/or source code. The testing stage may generate system test documentation and test summaries. The release stage may generate operational release and/or acceptance documentation. The post implementation stage may generate the project implementation documentation. Additionally, throughout different stages, the design documentation, the detailed project development documentation, the testing documentation, and the like may continue to evolve which generates yet more documentation.

In some embodiments, the documentation from various data sources may be stored in data storage 118. Although illustrated as a single storage, data storage 118 may include multiple storage devices, such as storage devices 118A and 118B, located throughout system 100. Additionally, data storage 118 may be a non-volatile storage suitable for long-term data storage and may be one of the storage devices discussed in FIG. 9.

Notably, as a project enters different stages, more and more documentation may be generated. Additionally, because the content of the documentation changes during various stages of the project it may be difficult, if not impossible, to track the documentation and the content, summarize the project at different stages of the project, and determine answers that may be found across various documents associated with the project. Further, because the documentation may be in different formats, a single computing device 104 may not be compatible with displaying the documentation in different formats.

As discussed above, generative AI system 108 may receive data associated with the common theme or domain, such as a project, from various data sources. As also discussed above, generative AI system 108 may use the data to generate answers to questions associated with the project, summarize the project, and the like. For example, generative AI system 108 may generate answers responsive to specific questions associated with the project, may generate a summary that may aid in determining whether the source code is functioning correctly, or may generate a summary that provides various details associated with a project as a whole or at various stages of the project. In some embodiments, generative AI system 108 may receive and process the data from data sources during an ingestion stage and generate answers and or summaries during an inference stage. The ingestion stage and inference stage are discussed in detail below.

As discussed above, generative AI system 108 includes one or more large language models (LLMs) 110. LLMs 110 may be artificial intelligence networks, including deep neural networks, that are trained to understand language from text or audio inputs, and in various languages. LLMs 110 may also understand content of images in some embodiments. LLMs 110 may include multiple layers, and multiple nodes within each layer that interconnect preceding and subsequent layers. As the data flows through the layers of the LLMs 110, the nodes may be activated using an activation function. The activation function may determine whether the data from the node is propagated to the subsequent layer. There may be thousands of layers, and billions of nodes in LLMs 110. During training, data from a training dataset flows through the model over thousands of iterations until the training dataset generates an expected output. Between each iteration, the weights associated with the nodes may be changed or modified until LLMs generate an answer within a predefined error threshold.

In some instances, after LLMs 110 are trained, LLMs 110 may be finetuned for a specific purpose or task. The finetuning may involve training LLMs 110 on a specialized training dataset, such as a training dataset that includes source code for programming projects, project documents to understand technical language, life sciences data to understand biology or pharmaceutical data, financial data for understanding financial data, and the like. LLMs 110 may also be finetuned to understand a combination of various tasks.

Once LLMs 110 are trained, LLMs 110 may be placed in a real-world to receive requests for information. The requests for information may have various types, such as a request to summarize data, request to answer a question, and the like, In some instances, the requests for information may be in a natural language in an alphanumeric form, audio form, video form, and the like. Based on the requests for information, one or more LLMs 110 may generate a response, which may include a summary, an answer to a question, and the like.

Chat service 112 may be an application interface that receives and transmits messages between generative AI chatbot interface 116 and generative AI system 108. Chat service 112 may receive requests for information from generative AI chatbot interface 116. Chat service 112 may determine whether the request for information includes standard or predefined commands. If so, the chat service 112 may convert the standard or predefined commands into one of the predefined prompts in an attempt to generate more accurate responses, and transmit the predefined prompts to LLMs 110. Chat service 112 may also determine that the request for information does not include standard or predefined commands. In this case, chat service 112 may transmit the request for information to LLMs 110. Similarly, once the LLMs 110 generate a response, the chat service 112 may transmit the response back to generate AI chatbot interface 116.

Data processing engine 114 may receive various documents over network 102 from a variety of data sources 118. Data processing engine 114 may convert the data in the documents into a unified format. Once in the data is in a unified format, data processing engine 114 may break the documents into smaller pieces, such as chunks.

Data processing engine 114 may user various parsers and formats to convert data from data sources into a unified format. Some data sources, such as high-level design documents, technical design documents, and product documents may be in a template format. Documents in a template format may be split along the template fields into chunks using various text-splitters for text data. In some embodiments, documents may be converted into a portable document format (PDF) format. Documents in the PDF format may be converted to text and the text may be divided into chunks using a text splitter. In other embodiments, documents may be converted into a HyperText Markup Language (HTML) format and then may be split into chunks using a Langchain loader, an unstructured HTML loader, or a BSHTML loader. In yet other embodiments, tables in the documents may be parsed using a Markdown language. In yet other embodiments, documents may be converted to the MediaWiki format that may include embeddings that handle links, images, tables, and other information included in the documents. Audio and video data sources may be converted to a text format using an audio-to-speech or video-to-speech converter. The text may then be divided into chunks using one of the above parsers and splitters. Data processing engine 114 may select from among multiple formats to convert data into a unified format, where the format may depend on a type of data included in the data sources.

Once the data processing engine 114 converts the documents into a unified format, data processing engine 114 may generate chunks of the data in the unified format. In this way, a document may be divided into multiple chunks having predefined sizes. The size of the chunks may vary but may typically be less than the maximum size of the input into LLMs 110. In some instances, data processing engine 114 may divide the document according to predefined rules. For example, a document that is greater than the predefined chunk size may be recursively divided in halves until the chunks are less than the predefined chunk size. In some instances, data processing engine 114 may split text to include complete paragraphs, sentences, or words to avoid having different portions of the paragraphs, sentences, or words are in different chunks.

In some instances, data processing engine 114 may assign metadata tags to chunks. Typically there may be one metadata tag for each chunk. The metadata tag may include a project identifier, a title of the document, a subtitle of the document, a hierarchy of the chunk as compared to other chunks in the document or in the section of the document, a hierarchy of the chunk in the project, etc.

The chunks and metadata may be stored in data storage 120. Although illustrated as a single storage, data storage 120 may include multiple storage devices located throughout system 100. Additionally, data storage 120 may be non-volatile storage suitable for long-term data storage and may be one of the storage devices discussed in FIG. 9

As discussed above, generative AI system 108 may operate during the ingestion stage and the inference stage. The various embodiments that use the above components during the ingestion stage and the inference stage are discussed below. In particular, FIGS. 2-3 are directed to one embodiment for training and using generative AI system 108, and FIGS. 4-8 are directed to a different embodiment for training and using the generative AI system 108.

Figure 2:
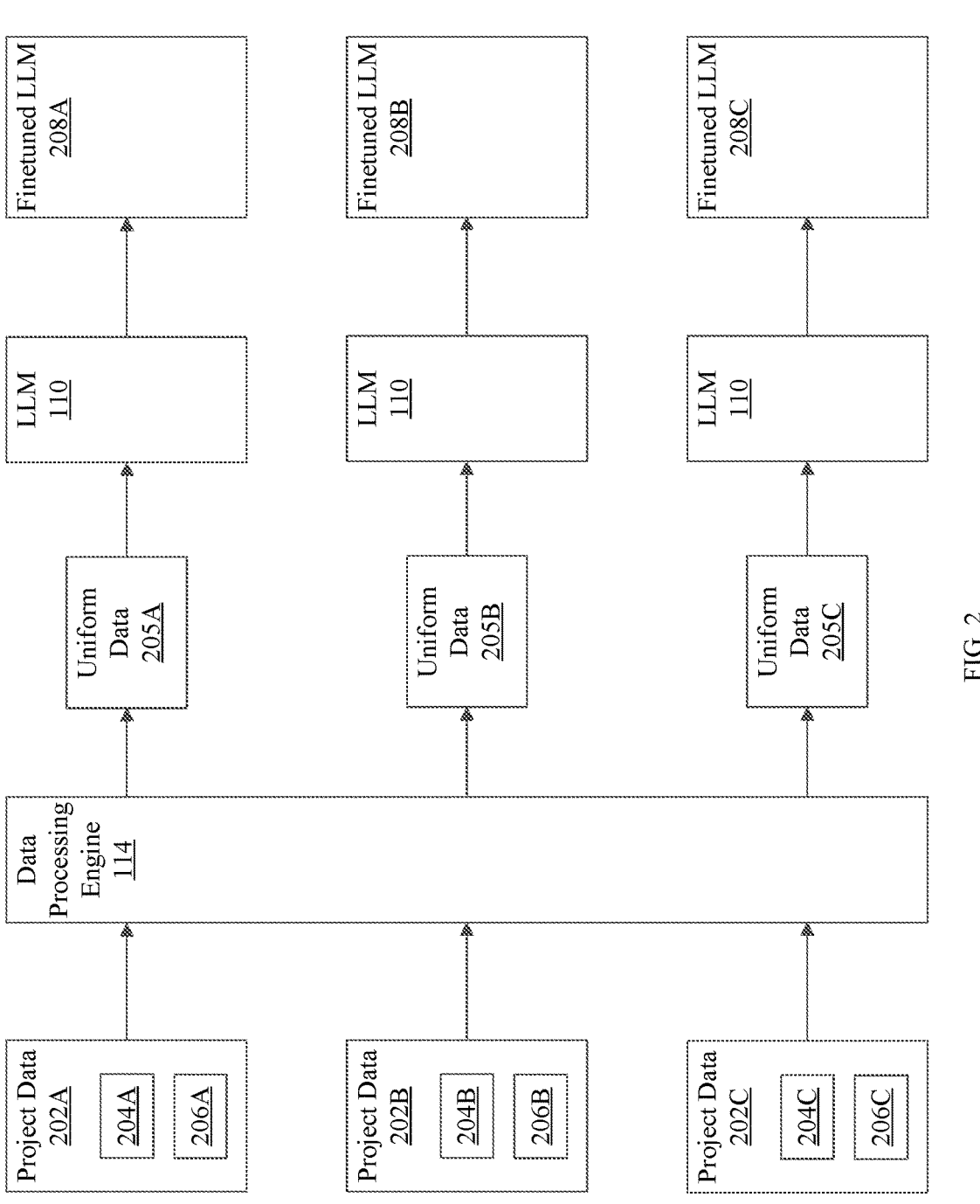
FIG. 2 is a block diagram of a generative AI system at an ingestion stage, according to some embodiments.
Figure 3:
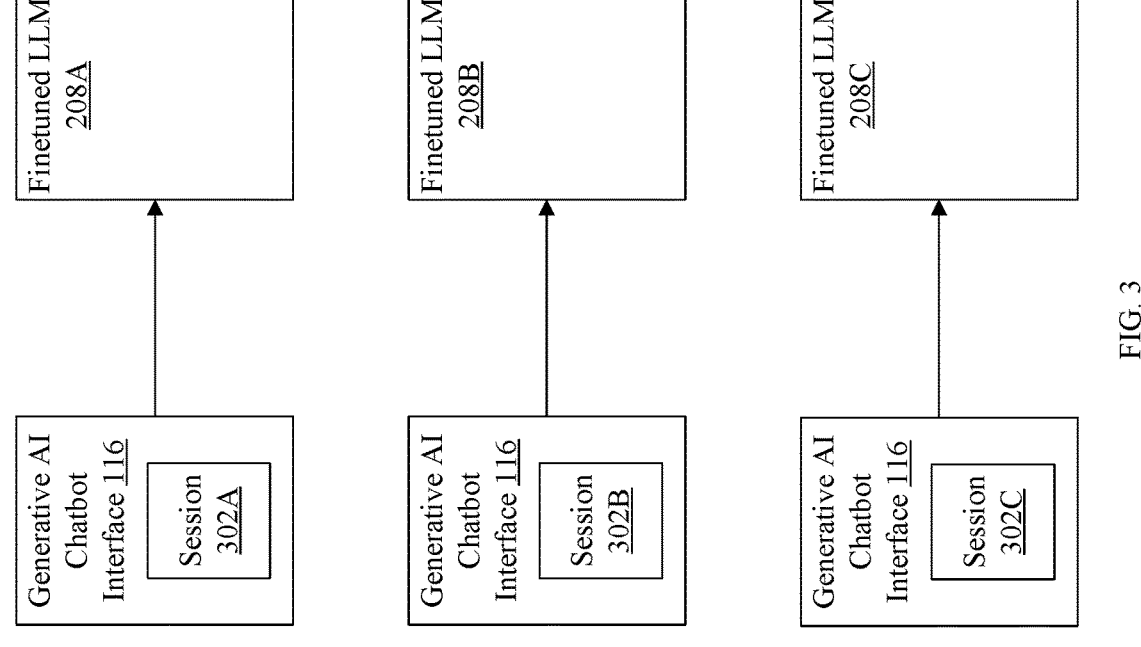
FIG. 3 is a block diagram of a generative AI system at an inference stage, according to some embodiments.

FIG. 2 is a block diagram of a generative AI system at an ingestion stage, according to some embodiments. FIG. 2 illustrates three different domains, that may each correspond to software project. The software projects include project data 202A, 202B and 202C. Project data 202A-C may be project information stored in various data sources discussed in FIG. 1. For example, project data 202A-C may be data incorporated in various documents and transcripts over various project stages. Project data 202A may be associated with a first project in a first domain, project data 202B may be associated with a second project in a second domain, and project data 202C may be associated with a third project in a third domain. In an exemplary embodiment, project data 202A may include documents 204A and transcripts 206A. Documents 204A may be documents including text data, images, tables, source code, and the like from various stages of the first project development. Transcripts 206A may be transcripts that may be meeting notes, transcripts of audio and/or video recordings, and the like. Similarly, project data 202B may include documents 204B and transcripts 206B from various development stages of the second project, and project data 202C may include documents 204C and transcripts 206C from various stages of development of the third project. Documents 204B and 204C may be respective documents including text data, images, tables, source code, and the like from various states of project development. Transcripts 206B and 206C may be respective transcripts including meeting notes, transcripts of audio and/or recordings, and the like from various states of project development.

During an ingestion stage, data processing engine 114 may receive project data 202A. Data processing engine 114 may convert project data 202A, including documents 204A and transcripts 206A into a uniform data 205A. Uniform data 205A is project data in a uniform format. The uniform data 205A may be any of the uniform formats discussed above. An instance of LLM 110 may be instantiated to receive the uniform data 205A and be finetuned on uniform data 205A. In some instances, an instance of LLM 110 may receive input that is less than a predefined input size. In this case, data processing engine 114 may divide uniform data 205A into chunks that are less than the predefined input size, and the instance of LLM 110 may receive uniform data 205A as chunks. An instance of LLM 110 that is finetuned on uniform data 205A may be LLM 208A. In some embodiments, data processing engine 114 may associate LLM 208A with an identifier. The identifier may correspond to project data 202A. In this way, LLM 208A that is finetuned on uniform data 202A may be selected using the identifier.

Similarly, during an ingestion stage, data processing engine 114 may receive project data 202B. Data processing engine 114 may convert project data 202B, including documents 204B and transcripts 206B into uniform data 205B. Uniform data 205B may be project data 202B in a uniform format. A second instance of LLM 110 may be instantiated to receive and be finetuned on uniform data 202B. Data processing engine 114 may also divide uniform data 205B into chunks in order for the second instance of LLM 110 to receive input that is less than a predefined input size of LLM 110. The second instance of LLM 110 that is finetuned on uniform data 205B may be LLM 208B. Like LLM 208A, data processing engine 114 may associate LLM 208B with an identifier which may correspond to project data 202B. In this way, LLM 208B that is finetuned on uniform data 202B may be selected using the identifier.

Similarly, during an ingestion stage, data processing engine 114 may receive project data 202C. Data processing engine 114 may convert project data 202C, including documents 204C and transcripts 206C into uniform data 205C. Uniform data 205C may be project data 202C in a uniform format. A third instance of LLM 110 may be instantiated to receive and be finetuned on uniform data 202C. Data processing engine 114 may also divide uniform data 205C into chunks in order for the third instance of LLM 110 to receive input that is less than the predefined size. The third instance of LLM 110 that is finetuned on uniform data 205C may be LLM 208C. Like LLMs 208A-B, LLM 208C that is finetuned on uniform data 202C, may be associated with an identifier which may correspond to project data 202C. In this way, LLM 208C that is finetuned on uniform data 202C may be selected using the identifier.

Notably, in an embodiment in FIG. 2, a first instance of LLM 110 is finetuned on project data 202A to generate LLM 208A, a second instance of LLM 110 is finetuned on project data 202B to generate LLM 208B, and a third instance of LLM 110 is finetuned on project data 202C to generate LLM 208C. In this way, LLMs 208A, 208B, and 208C include respective project data 202A, 202B, and 202C, which reduces the likelihood of LLMs 208A-C hallucinating, or the likelihood of project data 202A-202C being intermingled with data from other projects when LLMs 208A-C generate a response to a question during the inference stage discussed in FIG. 3.

FIG. 3 is a block diagram of a generative AI system at an inference stage, according to some embodiments. The inference stage in FIG. 3 may process information requests using finetuned LLMs 208A-C discussed in FIG. 2. To process information requests, LLM 208A may be instantiated in a computing environment and communicatively connected to generative AI chatbot interface 116. Once instantiated, LLM 208A may receive queries via generative AI chatbot interface 116 and generate responses to queries associated with project data 202A. Similarly, LLM 208B may be instantiated in a computing environment and communicatively connected to generative AI chatbot interface 116. Once instantiated, LLM 208B may receive queries from generative AI chatbot interface 116 and generate responses to queries associated with project data 202B. LLM 208C may be instantiated in a computing environment and communicatively connected to generative AI chatbot interface 116. Once instantiated, LLM 208C may receive queries from generative AI chatbot interface 116 and generate responses to queries associated with project data 202C.

For example, a user may access generative AI chatbot interface 116 and instantiate session 302A. Generative AI system 108 may use session 302A to enter into a dialogue with a user. During session 302A, generative AI chatbot interface 116 may receive an identifier for a first project associated with finetuned LLM 208A, and select finetuned LLM 208A from LLMs 208A-C. Next, generative AI chatbot interface 116 may receive a request for information, which may be a question about a project or a request for a summary. Generative AI chatbot interface 116 may transmit the request for information to the finetuned LLM 208A. The finetuned LLM 208A may generate a response, which may include an answer to the question or a summary, and transmit the response back to generative AI chatbot interface 116, which may then display the response to the user.

Similarly, a user may access generative AI chatbot interface 116 and instantiate session 302B. Generative AI system 108 may use session 302B to enter into a dialogue with a user. During session 302B, generative AI chatbot interface 116 may receive an identifier for a second project associated with finetuned LLM 208B. The identifier may cause generative AI system 108 to select finetuned LLM 208B from LLMs 208A-C. Next, generative AI chatbot interface 116 may receive a request for information, which may be a question or a request for a summary. Generative AI chatbot interface 116 may transmit the request for information to the finetuned LLM 208B. The finetuned LLM 208B may generate a response, which may include an answer or a summary, and transmit the response back to generative AI chatbot interface 116, which may then display the response to the user.

Finally, a user may access generative AI chatbot interface 116 and instantiate session 302C. Generative AI system 108 may use session 302C to enter into a dialogue with a user. During session 302C, generative AI chatbot interface 116 may receive an identifier for a third project associated with finetuned LLM 208C. The identifier may cause generative AI system 108 to select finetuned LLM 208C from LLMs 208A-C. Next, generative AI chatbot interface 116 may receive a request for information, which may be a question or a request for a summary. Generative AI chatbot interface 116 may transmit the request for information to the finetuned LLM 208C. The finetuned LLM 208C may generate a response, which may include an answer or a summary, and transmit the response back to generative AI chatbot interface 116, which may then display the response to the user.

Notably, since there is a one to one correspondence between finetuned LLMs 208A-C and corresponding projects, multiple users may conduct sessions 302A-C that request information from multiple finetuned LLMs 208A-C in parallel. Further, because finetuned LLMs 208A-C correspond to a single project and are finetuned on project specific data, such as respective project data 202A-C, the data from different projects is not commingled, nor is there a likelihood of each of the finetuned LLM 208A-C to provide a response that includes data from a different project.

In some embodiments, along with the response, finetuned LLMs 208A-C may also provide a link to the respective project data 202A-C that finetuned LLMs 208A-C used to generate a response. In this way, a user viewing the response on the generative AI chatbot interface 116 may identify the sources of the data, and identify whether finetuned LLMs 208A-C returned a genuine response.

Going back to FIG. 1, generative AI system 108 may also include LLMs 110 that are not trained on project specific data, unlike the embodiments in FIGS. 2-3. Instead, during the ingestion stage the project data from various projects is divided into chunks, metadata tags, embedded into vectors and incorporated into dictionaries. During the inference stage, the LLMs 110 use the dictionaries, metadata tags, and vectors to identify chunks relevant to answering the query, and then generate the answer to the query. These embodiments are described in FIGS. 4-8, below.

Figure 4:
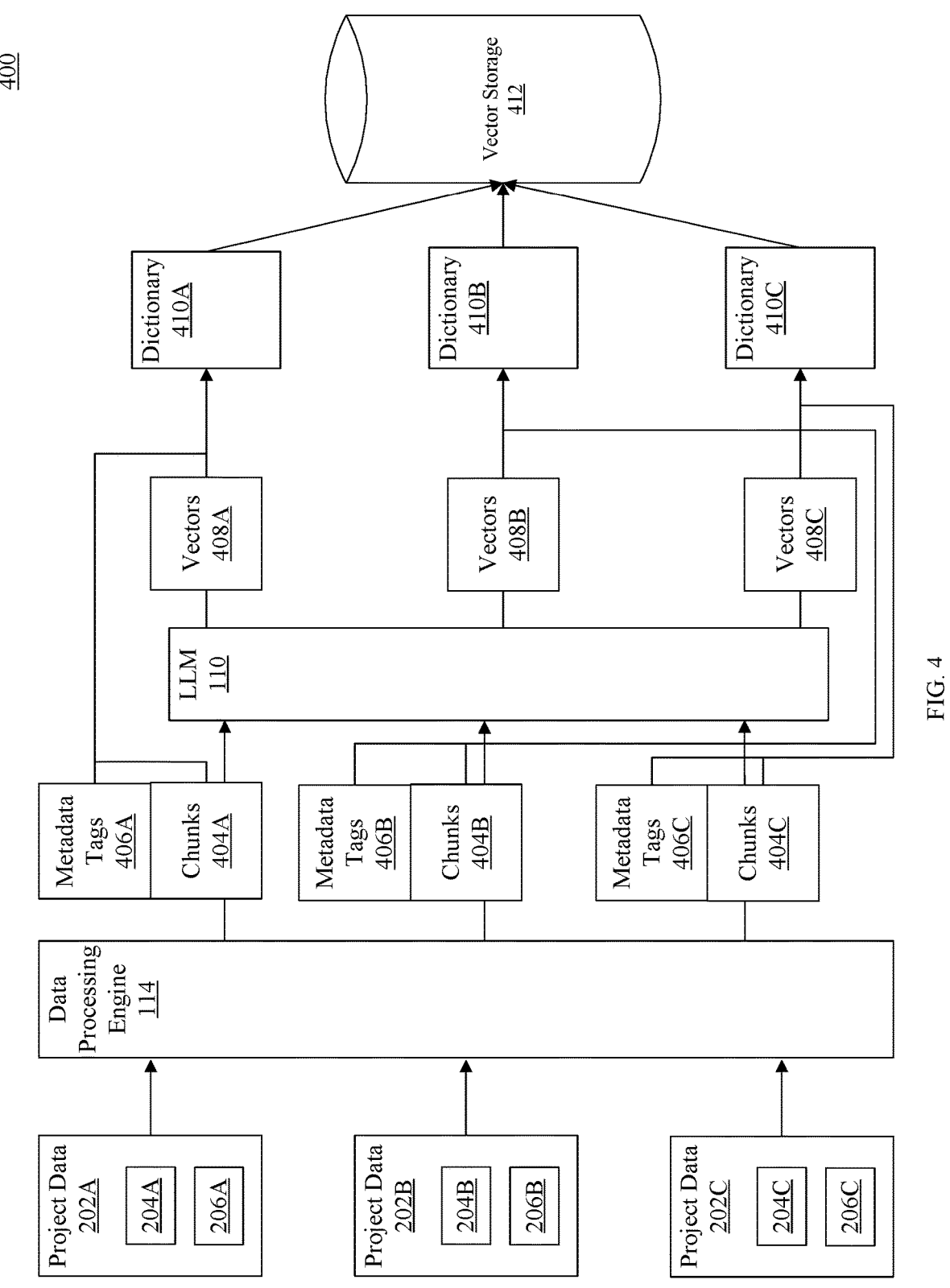
FIG. 4 is a block diagram of a generative AI system at an ingestion stage, according to some embodiments.

FIG. 4 is a block diagram of a generative AI system at an ingestion stage, according to some embodiments. Similarly to FIG. 2, generative AI system 108 may ingest project data 202A-C associated with three projects. Project data 202A-C may include documents 204A and transcripts 206A associated with project data 202A, documents 204B and transcripts 206B associated with project data 202B, and documents 204C and transcripts 206C associated with project data 202C.

Data processing engine 114 may receive project data 202A-C. For illustrative purposes, suppose data processing engine 114 receives project data 202A, including documents 204A and transcripts 206A. Data processing engine 114 may convert documents 204A and transcripts 206A into chunks 404A. In particular, data processing engine 114 may standardize documents 204A and transcripts 206A into a unified format as discussed above. Next, data processing engine 114 may divide the data from documents 204A and transcripts 206A in the unified format into chunks where each chunk is less than a predefined chunk size. Additionally, the chunks may be divided according to one or more rules, such as including complete words, sentences, and paragraphs in one chunk, keeping data from one or more tables within one chunk, not dividing images between chunks, and the like. Data processing engine 114 may recursively generate chunks by dividing the available data from each document 204A or transcript 206A in half, until data processing engine 114 generates chunks that are less than a predefined chunk size.

Data processing engine 114 may also generate a metadata tags 406A, and associate each metadata tag in metadata tags 406A with each chunk in chunks 404A. Each metadata tag may include a project identifier associated with project data 202A. The metadata tag may also include a chunk identifier, a size of the chunk, a title of document 204A or transcript 206A that is included in the chunk, a subtitle corresponding to a section of document 204A or transcript 206A, a hierarchy of the chunk compared to other chunks, and the like.

In some embodiments, one of LLMs 110, such as an embedding LLM, may receive chunks 404A. From chunks 404A, LLM 110 may generate embedding vectors or simply vectors 408A. Vectors 408A may include elements that are numeric representations of chunks 404A in the n-dimensional space, e.g., the embedding space, that store the information included in chunks 404A. From vectors 408A information included in chunks 404A may be recreated. Typically, one vector in vectors 408A may be generated for one chunk in chunks 404A.

In some embodiments, generative AI system 108 may generate a dictionary 410A. Dictionary 410A may include or be associated with a project identifier, document chunks 404A, metadata tags 406A, and vectors 408A. Alternatively dictionary 410A may include pointers to locations in data storage 120 that stores chunks 404A, metadata tags 406A, and vectors 408A. In this way, dictionary 410 may be used to identify locations of one or more document chunks 404A, metadata tags 406A, and vectors 408A associated with project data 202A.

Generative AI system 108 may also include vector storage 412. Vector storage 412 may be data storage 120 discussed in FIG. 1. Vector storage 412 may store a project identifier, document chunks 404A, metadata tags 406A, and vectors 408A associated with project data 202A.

As discussed above, generative AI system 108 may process project data 202B and project data 202C. Generative AI system 108 may process project data 202B and project data 202C similarly to project data 202A. For example, data processing engine 114 may generate chunks 404B from project data 202B and generate metadata tags 406B associated with chunks 404B. Each metadata tag 406B may include at least a project identifier for project data 202C, along with other metadata specific to each chunk in chunks 404B. From chunks 404B, an embedding LLM in LLMs 110 may generate vectors 408B, one vector in vectors 408B for one chunk in chunks 404B. Generative AI system 108 may combine the chunks 404B, metadata tags 406B and vectors 408B associated with project data 202B into dictionary 410B, which may be stored in vector storage 412 or in another data storage 120 discussed in FIG. 1.

Similarly, generative AI system 108 may process project data 202C. For example, data processing engine 114 may generate a project identifier for project data 202C. Data processing engine 114 may also generate chunks 404C from project data 202C and generate metadata tags 406C associated with chunks 404C. Each metadata tag in metadata tags 406C may include at least a project identifier for project data 202C, along with other metadata specific to each chunk in chunks 404C. From chunks 404C, the embedding LLM in LLMs 110 may generate vectors 408C, one vector in vectors 408C for one chunk in chunks 404C. Generative AI system 108 may combine the chunks 404C, metadata tags 406C and vectors 408C associated with project data 202C into dictionary 410C, which may be stored in vector storage 412 or in another data storage 120 discussed in FIG. 1.

Notably, in the ingestion stage discussed in FIG. 4, LLMs 110 are not finetuned, e.g., trained on project specific data, as discussed in FIG. 2. Instead, project data 202A-C from different projects is divided into chunks 404A-C and is assigned a project identifier that is included in the respective metadata tags 406A-C. Metadata tags 406A-C associate chunks 404A-C and vectors 408A-C via dictionaries 410A-C. Further, the embedding LLM in LLMs 110 may not be a specialized LLM or may be an LLM that is finetuned to generate embeddings on historical project data that is not specific to a project.

In some embodiments, LLMs 110 may be trained to increase accuracy of the information requests received during the inference stage. For example, LLMs 110 may be trained on a few shot learning technique that classifies data according to type. For example, LLMs 110 may be trained on information requests having different types, e.g., question/answer requests, summarization requests, etc., until LLMs 110 learn to classify information requests into question/answer requests, summarization requests, and the like. In this way, once generative AI system 118 receives the information request, the information request may be classified for request specific processing discussed in FIG. 5.

Figure 5:
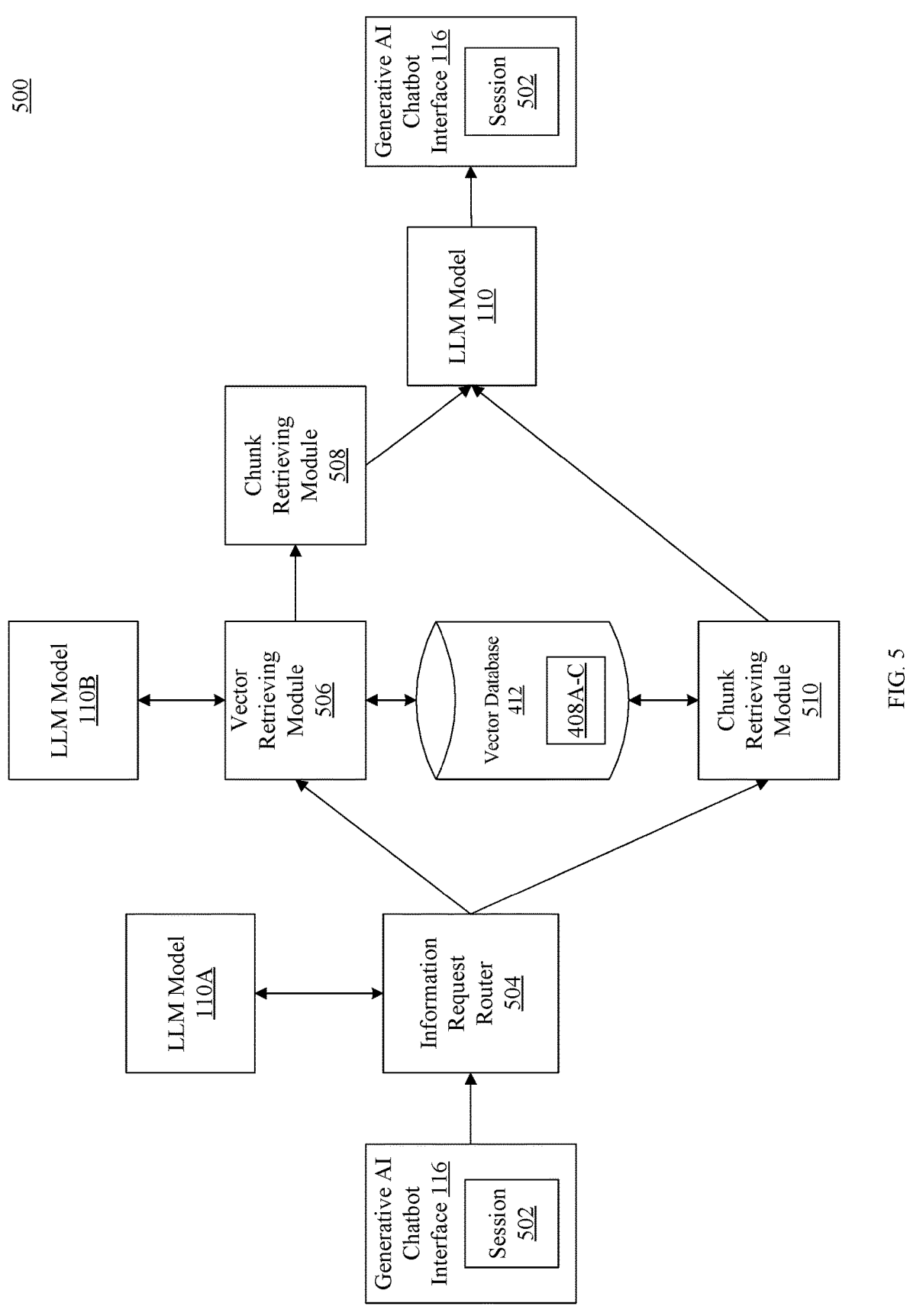
FIG. 5 is a block diagram of a generative AI system at an inference stage, according to some embodiments.

FIG. 5 is a block diagram of a generative AI system at an inference stage, according to some embodiments. Prior to inference stage, LLMs 110 may be instantiated in a computing environment, such as on service provider server 106 discussed in FIG. 1. During the inference stage, generative AI system 108 may receive information requests and generate a response. To receive an information request, generative AI system 108 may cause generative AI chatbot interface 116 that executes on computing device 104 to instantiate session 502. During session 502, generative AI system 108 may enter into a dialogue with a user operating computing device 104 via generative AI chatbot interface 116. As part of the dialogue, generative AI system 108 may receive an identifier, such as a project identifier and a request for information. For exemplary purposes, suppose the identifier is associated with project data 202A.

In some embodiments, generative AI system 108 may include an information request router 504. Information request router 504 may route the information request for request-specific processing based on a type of the information request. Example types of an information request may be a question and a request for a summary. Information request router 504 may pass the information request or a dialogue that includes the information request to one of LLMs 110, such as an LLM 110A. LLM 110A may determine that the information request is a question that may be answered or a request for a summary. In some embodiments, to increase accuracy of a response, LLM 110A may be trained using a few shot learning technique. A few shot learning technique may classify data according to an information request type. The information request types may be question/answer requests, summarization requests, or the like. Once trained, LLM 110A may receive the dialogue or information request and may classify the information request as a question/answer request, a summary request, or the like.

In some embodiments, LLM 110A may also identify a project identifier for a project from the dialogue or from the information request.

If information request router 504 determines that the information request is a question/answer request, information request router 504 passes the information request to vector retrieving module 506. Vector retrieving module 506 may use one of LLMs 110, such as LLM 110B to generate an embedding vector from the information request. Next, vector retrieving module 506 may identify dictionary 410A using a project identifier, and vectors 408A from dictionary 410A. Next, vector retrieving module 506 may perform a similarity search between the embedding vector associated with the information request and embedding vectors 408A associated with a project data 202A. A similarity search may find the top K (where K is a zero or a positive integer) most similar vectors from vectors 408A. An example similarity algorithm may be a shorted distance algorithm that determines the shortest distance between vector points corresponding to vectors in the embedding space. Another example similarity algorithm may be a dot product search algorithm that measures how aligned the two vectors are, e.g., whether the vectors are pointing in the same direction indicating similar vectors, opposite direction indicating dissimilar vectors, or are perpendicular to each other indicating that the vectors are unrelated. The vector dot product may be determined by multiplying the corresponding elements of the vectors and adding up the results to get a single scalar number. Yet another example similarity algorithm may be a cosine similarity search that measures a similarity between two vectors using the angle between these two vectors.

Based on the similarity search, vector retrieving module 506 may retrieve the top K vectors from vectors 408A. Vector retrieving module 506 may rank the top K vectors according to similarity from the most similar vector to the least similar vector. Next, vector retrieving module 506 may pass the ranked top K vectors to a chunk retrieving module 508. The chunk retrieving module 508 may convert the ranked top K vectors into chunks. Alternatively, chunk retrieving module 508 may use dictionary 410A to access the subset of chunks from chunks 404A that correspond to the ranked top K vectors. In some embodiments, the subset of chunks may be in the same order as the ranked top K vectors.

One of LLM models, such as LLM 110C may receive one or more chunks in the subset of chunks to generate an answer to the question in the information request. In some embodiments, LLM 110C may receive the chunk that corresponds to the most similar vector first, and then refine the answer with each subsequent chunk. For example, LLM 110C may receive a first chunk in the subset of chunks to generate an answer. Next, LLM 110C may receive a second chunk and the answer generated from the first chunk to generate a second answer. Next, LLM 110C may receive a third chunk and the answer generated using the first and second chunks. The process may continue until LLM 110C uses all chunks in the subset of chunks or until LLM 110C determines that the content of the answer no longer changes.

In other embodiments, LLM 110C may receive all chunks in the subset of chunks to generate an answer to the question. If LLM 110C does not generate an answer to the question, additional vectors may be retrieved using vector retrieving module 506 from vector storage 412.

Once LLM 110C generates an answer, generative AI system 108 may transmit the answer in a response to generative AI chatbot interface 116.

If information request router 504 determines that the information request is a request for a summary, information request router 504 passes the information request to chunk retrieving module 510. Chunk retrieving module 510 may parse the metadata tags in dictionary 410A associated with project data 202A to determine tags that indicate that the corresponding chunk may include information that contributes to the summary. Once chunk retrieving module 510 identifies a subset of chunks from chunks 404A that may contribute to the summary, chunk retrieving module 510 may forward the chunks to LLM 110C. LLM 110C may receive and summarize the subset of chunks into a summary. In some instances, LLM 110C may summarize the subset of chunks over several iterations to refine the summary. For example, LLM 110C may receive a first chunk in the subset of chunks to generate a summary. Next, LLM 110C may receive a second chunk and a summary generated from the first chunk to generate a summary. Next, LLM 110C may receive a third chunk and the summary generated using the first and second chunks. The process may continue until LLM 110C uses all chunks in the subset of chunks or until LLM 110C determines that the content of the summary is no longer being modified.

Once LLM 110C generates a summary, generative AI system 108 may transmit the summary in a response to session 502 conducted using generative AI chatbot interface 116.

In some embodiments, LLMs 110A-C may be the same LLM in LLMs 110 or may be different LLMs 110.

In some embodiments, chunk retrieving modules 508 and 510 may be the same or different software modules.

Although the embodiments above describe generative AI system 108 generating a response for project data 202A, the embodiments above are exemplary, and generative AI system 108 may similarly generate responses for project data 202B-C when generative AI system 108 receives a corresponding project identifier.

In some embodiments, generative AI system 108 may reduce or eliminate a number of AI hallucinations from the response. An AI hallucination may occur when one of LLMs 110 may create an answer or a summary that is not based on chunks 404. To reduce the likelihood of the hallucinations, the response displayed in session 502 of generative AI chatbot interface 116 may also include chunks 404 and/or original documents 204 and/or transcripts 206, or links to chunks 404 and/or original documents 204 and/or transcripts 206 from which LLMs 110 generated a response.

FIG. 6 is a flowchart of a method 600 for ingesting data from data sources, according to some embodiments. Method 600 may be performed using hardware and/or software components described in FIGS. 1-5. Note that one or more of the operations may be deleted, combined, or performed in a different order as appropriate. Prior to method 600, LLMs 110 may be instantiated in generative AI system 108 to receive data and perform AI related tasks, such as generating embedding vectors 208, and the like.

At operation 602, an identifier is generated. For example, data processing engine 114 may generate an identifier for the data associated with a common theme or domain. In one embodiment, data processing engine 114 may generate a project identifier for the project data 202A associated with a domain that is a project. As discussed above, project data 202A may include documents 204A and transcripts 206A that may be stored in multiple data sources 118 connected by network 102, and that may have been created over different stages of project development.

At operation 604, chunks and metadata tags are generated. For example, data processing engine 114 may convert project data 202A including documents 204A and transcripts 206A into a uniform format. Next, data processing engine 114 may recursively generate chunks 404A based on rules and predefined chunk size. As discussed above, example rules may divide the text to include complete sentences, words, or paragraphs, table data and an image in one chunk. Additionally, data processing engine 114 may generate metadata tags 406A. Metadata tags 406A may include a project identifier, a chunk identifier, a title of document 204A or transcript 206A from which chunks 404 were generated, a hierarchy of the chunk with respect to other chunks, etc. There may be one metadata tag in metadata tags 406A for one chunk in chunks 404A.

At operation 606, vectors are generated. For example, an embedding LLM in LLMs 110 may generate vectors 408A from chunks 404A. Vectors 408A may include embeddings in the embedding space that correspond to the data stored in chunks 404A. There may be one chunk in chunks 404A for one vector in vectors 408A.

At operation 608, a dictionary is generated. For example, generative AI system 108 may generate dictionary 410A that links the project identifier, vectors 408A, chunks 404A, and metadata tags 406A associated with project data 202A.

At operation 610, the dictionary is stored. For example, dictionary 410A along with the project identifier, vectors 408A, chunks 404A, and metadata tags 406A may be stored in vector storage 412, or in a combination of various data storage 120 discussed in FIG. 1. Dictionary 410A along with vectors 408A, chunks 404A, and metadata tags 406A may be stored in vector storage 412 with dictionaries 410B-410C associated with other projects, such as project data 202B-202C.

FIG. 7 is a flowchart of a method 700 for generating a response to an information request, according to some embodiments. Method 700 may be performed using hardware and/or software components described in FIGS. 1-5. Note that one or more of the operations may be deleted, combined, or performed in a different order as appropriate. Prior to method 700, LLMs 110 may be instantiated in generative AI system 108 to receive data and perform AI related tasks, such as identifying types of information requests, generating embedding vectors from information requests, converting chunks into responses, and the like.

At operation 702, a session is instantiated. For example, generative AI chatbot interface 116 may instantiate a session on computing device 104. The session may be between generative AI system 118 and a user operating computing device 104. Session 502 may receive information requests from a user and display responses generated using generative AI system 108.

At operation 704, a project identifier and a request for information are received. For example, generative AI chatbot interface may enter into a dialogue with a user in session 502. The dialogue may include a project identifier and a request for information associated with the project.

At operation 706, a determination that the information request is a question/answer request is made. For example, information request router 504 may use LLM 110A to identify the project identifier and classify the information request as a question/answer request from the dialogue.

At operation 708, a vector is generated. For example, vector retrieving module 506 may use LLM 110B to identify a question in the information request and generate a vector from the question.

At operation 710, a dictionary is accessed. For example, vector retrieving module 506 may access dictionary 410 that corresponds to the project identifier. For example, if project identifier corresponds to project data 202A, vector retrieving module 506 may access dictionary 410A.

At operation 712, similar vectors are identified. For example, vector retrieving module 506 may use a similarity algorithm to identify a subset of vectors from vectors 408A by comparing the vector associated with the question to vectors 408A. In some instances, vectors in the subset of vectors may be ranked from the most similar to the least similar.

At operation 714, chunks are identified. For example, chunk retrieving module 508 may use the subset of vectors and dictionary 410A to identify the subset of chunks from chunks 404A that correspond to the subset of vectors. In some instances, chunks in the subset of chunks may be in the order of the ranked vectors in the subset of vectors.

At operation 716, an answer to the question is determined. For example, LLM 110C may determine an answer to the question from the subset of chunks from chunks 404A. In some instances, the answer to the question may be refined by feeding a chunk from the subset of chunks into LLM 110C together with the summary that the LLM 110C generated using a previous chunk or chunks from the subset of chunks. Generative AI system 108 may transmit the answer in a response to generative AI chatbot interface 116.

FIG. 8 is a flowchart of a method 800 for generating a response to an information request, according to some embodiments. Method 800 may be performed using hardware and/or software components described in FIGS. 1-5. Note that one or more of the operations may be deleted, combined, or performed in a different order as appropriate. Prior to method 800, LLMs 110 may be instantiated in generative AI system 108 to receive data and perform AI related tasks, such as identifying types of information requests, generating embedding vectors from information requests, converting chunks into responses, and the like.

At operation 802, a session is instantiated. For example, generative AI chatbot interface 116 may instantiate a session on computing device 104. The session may be between generative AI system 118 and a user operating computing device 104. Session 502 may receive information requests from a user and display responses generated using generative AI system 108.

At operation 804, a project identifier and a request for information are received. For example, generative AI chatbot interface may enter into a dialogue with a user. The dialogue may include a project identifier and a request for information associated with the project.

At operation 806, a determination that the information request is a request for a summary is made. For example, information request router 504 may use LLM 110A to identify the project identifier and classify the information request as a request for the summary from the dialogue.

At operation 808, a dictionary is accessed. For example, chunk retrieving module 508 may access dictionary 410 that corresponds to the project identifier. For example, if project identifier corresponds to project data 202A, chunk retrieving module 508 may access dictionary 410A.

At operation 810, chunks are retrieved. For example, chunk retrieving module 510 may use dictionary 410A to access a subset of chunks from chunks 404A using metadata tags 406A. The subset of chunks may include at least one chunk. The metadata tags 406A may include information for identifying the subset of chunks that may include information that may contribute to the summary. For example, metadata tags 406A that include titles of information stored in chunks 404A may indicate whether a chunk may or may not contribute to the summary.

At operation 812, a summary is generated. For example, LLM 110C may determine a summary from the subset of chunks from chunks 404A. In some instances, the summary may be refined by feeding a chunk from the subset of chunks into LLM 110C together with the summary that the LLM 110C generated using a previous chunk or chunks from the subset of chunks. Generative AI system 108 may transmit the summary in a response to generative AI chatbot interface 116.

Notably, the embodiments are directed to a technical solution that uses artificial intelligence and LLMs 210 to retrieve information included in data from various data sources. The embodiments involve LLMs 210 that include thousands of layers and billions of parameters that are trained to identify a next word in a natural language. The embodiments are further directed to a technical solution for standardizing, dividing, tagging, and embedding data into a format that aids in providing data to LLMs 210 and aids LLMs 210 to accurately retrieve information.

Figure 9:
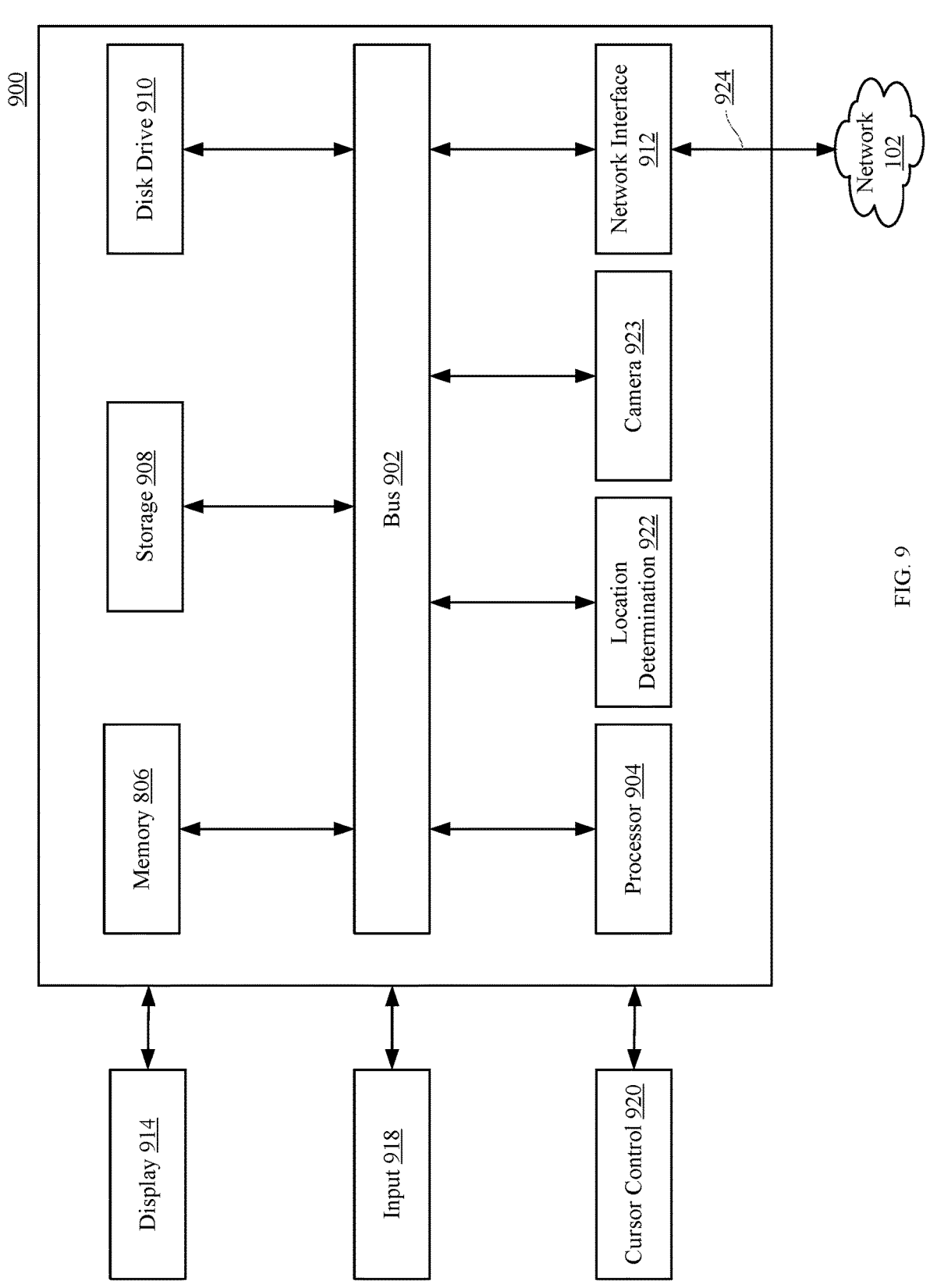
FIG. 9 is a block diagram of a computer system suitable for implementing one or more components or operations in FIGS. 1-8 according to an embodiment.

Referring now to FIG. 9 an embodiment of a computer system 900 suitable for implementing, the systems and methods described in FIGS. 1-8 is illustrated.

In accordance with various embodiments of the disclosure, computer system 900, such as a computer and/or a server, includes a bus 902 or other communication mechanism for communicating information, which interconnects subsystems and components, such as a processing component 904 (e.g., processor, micro-controller, digital signal processor (DSP), graphics processing unit (GPU), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), a location determination component 922 (e.g., a Global Positioning System (GPS) device as illustrated, a cell tower triangulation device, and/or a variety of other location determination devices known in the art), and/or a camera component 923. In one implementation, the disk drive component 910 may comprise a database having one or more disk drive components.

In accordance with embodiments of the disclosure, the computer system 900 performs specific operations by the processor 904 executing one or more sequences of instructions contained in the memory component 906, such as described herein with respect to the mobile communications devices, mobile devices, and/or servers. Such instructions may be read into the system memory component 906 from another computer readable medium, such as the static storage component 908 or the disk drive component 910. In other embodiments, hard-wired circuitry may be used in place of or in combination with software instructions to implement the disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 900. In various other embodiments of the disclosure, a plurality of the computer systems 900 coupled by a communication link 924 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system comprising:
one or more non-transitory memories storing instructions; and
one or more hardware processors coupled to the non-transitory memories and configured to read the instructions from the non-transitory memories to cause the system to perform operations comprising:
receiving an identifier and a request for information from a chatbot interface;
generating, using at least one large language model, a vector from the request for the information;
accessing a dictionary from a plurality of dictionaries with the identifier, the dictionary comprising pointers to locations of a plurality of vectors and a plurality of chunks in a data storage, wherein the plurality of chunks correspond to data associated with the identifier from a plurality of data sources;
identifying, using a similarity algorithm, a subset of vectors from the plurality of vectors in the dictionary that are similar to the vector associated with the request for the information, wherein the subset of vectors that are similar comprise parameters within a predefined distance from parameters of the vector associated with the request for the information;
identifying a subset of chunks corresponding to the subset of vectors; and
generating, using the at least one large language model, a response to the request for the information from the subset of chunks.

2. The system of claim 1, wherein the request for the information is included in a dialogue between an artificial intelligence chatbot and a user.

3. The system of claim 1, further comprising:

ranking the subset of vectors according to similarity indicated by the similarity algorithm; and retaining a predefined number of vectors in the subset of vectors according to the ranking.

4. The system of claim 3, wherein identifying the subset of chunks further comprises:

identifying the subset of chunks in an order of the ranked subset of vectors; and generating the response to the request using the subset of chunks in the order of the ranked subset of vectors.

5. The system of claim 1, wherein the request for the information is associated with a software project.

6. The system of claim 1, wherein the information is from a plurality of sources and includes at least one document or at least one transcript that includes alphanumeric text.

7. The system of claim 1, wherein the at least one large language model is finetuned using historical data from a plurality of software projects.

8. The system of claim 1, further comprising:

determining that the request for the information is a question associated with a project, and wherein the response is an answer to the question.

9. The system of claim 1, wherein the identifier for the data is generated using a large language model.

10. A non-transitory machine-readable medium having stored thereon machine-readable instructions executable to cause a machine to perform operations comprising:

receiving an identifier and a request for information from a chatbot interface;

generating, using at least one large language model, a vector from the request for the information;

accessing a dictionary from a plurality of dictionaries with the identifier, the dictionary comprising pointers to locations of a plurality of vectors and a plurality of chunks in a data storage, wherein the plurality of chunks correspond to data associated with a plurality of data sources;

identifying, using a similarity algorithm, a subset of vectors from the plurality of vectors in the dictionary that are similar to the vector associated with the request for the information, wherein the subset of vectors that are similar comprise parameters within a predefined distance from parameters of the vector associated with the request for the information;

identifying a subset of chunks corresponding to the subset of vectors; and generating, using the at least one large language model, a response to the request for the information using the subset of chunks.

11. The non-transitory machine-readable medium of claim 10, wherein the request for the information is the request for a summary of a project.

12. The non-transitory machine-readable medium of claim 10, wherein the dictionary further comprises a plurality of metadata tags, wherein a subset of metadata tags identify a title associated with a data source in the plurality of data sources.

13. The non-transitory machine-readable medium of claim 12, wherein the identifying the subset of chunks further comprises:

identifying the subset of chunks corresponding to the subset of metadata tags.

14. A method comprising:

receiving an identifier and a request for information from a chatbot interface;

generating, using a processor and at least one large language model executing on the processor, a vector from the request for the information;

accessing, using the identifier, a dictionary from a plurality of dictionaries stored in a memory, the dictionary comprising pointers to locations of a plurality of vectors and a plurality of chunks, wherein the plurality of chunks correspond to data associated with the identifier from a plurality of data sources;

identifying, using a similarity algorithm, a subset of vectors from the plurality of vectors in the dictionary that are similar to the vector associated with the request for the information, wherein the subset of vectors that are similar comprise parameters within a predefined distance from parameters of the vector associated with the request for the information;

identifying a subset of chunks corresponding to the subset of vectors; and generating, using the at least one large language model, a response to the request for the information from the subset of chunks.

15. The method of claim 14, wherein the request for the information is included in a dialogue between an artificial intelligence chatbot and a user.

16. The method of claim 14, further comprising:

ranking the subset of vectors according to similarity; and retaining a predefined number of vectors in the subset of vectors according to the ranking.

17. The method of claim 16, wherein identifying the subset of chunks further comprises:

identifying the subset of chunks in an order of the ranked subset of vectors; and generating the response to the request using the subset of chunks in the order of the ranked subset of vectors.

18. The method of claim 14, wherein the information is from a plurality of sources and includes at least one document or at least one transcript that includes alphanumeric text.

19. The method of claim 14, wherein the at least one large language model is finetuned using historical data from a plurality of software projects.

20. The method of claim 14, further comprising:

determining that the request for the information is a question associated with a project, and wherein the response is an answer to the question.

* * * * *